US008234155B2

(12) United States Patent
Malov et al.

(10) Patent No.: US 8,234,155 B2
(45) Date of Patent: Jul. 31, 2012

(54) METHOD AND SYSTEM INCORPORATING BUSINESS RULES AND PRICE OPTIMIZATION FOR FINANCIAL SYSTEM

(75) Inventors: Denis Malov, Scottsdale, AZ (US); Zhibin Cao, Phoenix, AZ (US)

(73) Assignee: SAP AG, Walldorf (DE)

( * ) Notice: Subject to any disclaimer, the term of this patent is extended or adjusted under 35 U.S.C. 154(b) by 844 days.

(21) Appl. No.: 11/948,610

(22) Filed: Nov. 30, 2007

(65) Prior Publication Data
US 2009/0144103 A1    Jun. 4, 2009

(51) Int. Cl.
*G06Q 30/00* (2012.01)
(52) U.S. Cl. ...................................... 705/7.35
(58) Field of Classification Search .................. 705/7.35
See application file for complete search history.

(56) References Cited

U.S. PATENT DOCUMENTS

| | | | | |
|---|---|---|---|---|
| 6,963,854 | B1* | 11/2005 | Boyd et al. ...................... | 705/37 |
| 7,617,119 | B1* | 11/2009 | Neal et al. ...................... | 705/10 |
| 2003/0110066 | A1* | 6/2003 | Walser et al. .................... | 705/7 |
| 2005/0015800 | A1* | 1/2005 | Holcomb ........................ | 725/35 |
| 2005/0222926 | A1* | 10/2005 | Sarkar et al. .................... | 705/35 |
| 2007/0043655 | A1* | 2/2007 | Phillips et al. ................... | 705/38 |
| 2008/0256014 | A1* | 10/2008 | Gould et al. .................... | 706/48 |

OTHER PUBLICATIONS

Gallagher, Julie, "Pricing by the Rules; Price Management Systems Are Helping Retailers Compete by Automating Price Changes According to a Strategically Designed Set of Rules," Supermarket News, New York, Aug. 16, 2004, vol. 52, Iss. 33, p. 49.*

* cited by examiner

*Primary Examiner* — Nathan Erb
(74) *Attorney, Agent, or Firm* — Buckley, Maschoff & Talwalkar LLC

(57) ABSTRACT

A computer system for modeling a portfolio of products in a financial system to determine the rate of a target product. The products are defined by attribute values, an attribute being any criteria that impacts product rates. Linear associated product rules are used by the computer system to create an optimized scenario of total profit and overall volume of sales for the portfolio. From the optimized scenario a rate for the target product can be determined which maintains a financial institution's strategic and business objectives. The optimizing process includes applying the associated product rules to products actively contributing to key performance indicators. Densification is then used to infer the rate for all other products in the portfolio. Finally, if the starting rate of a product violates an associated product rule, the starting rate is relaxed to avoid the violation.

21 Claims, 16 Drawing Sheets

FIG. 4a

| | | | USER: TEST_ALL TEST_ALL |
|---|---|---|---|
| FILE | PREFERENCES | HELP | |

AUTO-INDIRECT

| AUTO-INDIRECT | HOME-EQUITY-PRODUCTS | DEPOSITS |
|---|---|---|

| BUSINESS RULES | APR RULES |
|---|---|

SELECT APR RULES

☐ CREATE NEW RULESET
NEW RULESET NAME [ RULE 1 ] — 120

— 118

ATTRIBUTE

— 116 ⎬ (RULE TYPE, RATE MOVEMENT DIRECTION)

| ATTRIBUTE NAME | | RULE TYPE | | RATE MOVEMENT DIRECTION | |
|---|---|---|---|---|---|
| AGE | ⊙ | GAP | ⊙ | RATE INCREASE WITH EXACT GAP | ⊙ |
| FICO | ⊙ | PRICING | ⊙ | RATE INCREASE WITH MINIMUM GAP | ⊙ |
| TERM | ⊙ | PRICING | ⊙ | RATE INCREASE WITH MINIMUM GAP | ⊙ |

— 122

APR VALUES FOR PRICING ATTRIBUTE SELECTED ABOVE

— 124 ⎬ (GAP VALUES (IN BP: BASIS POINTS))

| ATTRIBUTE GROUPS | ATTRIBUTE RANGES | GAP VALUES (IN BP: BASIS POINTS) |
|---|---|---|
| APR: MY | 2000 TO 2001 | 5 |
| APR: MY | 2001 TO 2002 | 5 |
| APR: MY | 2002 TO 2003 | 5 |
| APR: MY | 2003 TO 2004 | 5 |
| APR: MY | 2004 TO 2005-2006 | 5 |

— 126  — 128  — 130

— 134

[ SAVE ]  [ DELETE ]

MESSAGE: 0 OF 0

LOGOFF

| FILE | PREFERENCES | HELP | | USER: TEST_ALL TEST_ALL |
|---|---|---|---|---|

PRICE ACTIVITY CALENDAR
BUSINESS RULES LIBRARY
ADMINISTRATION & CONFIGURATION
PROCESSING

AUTO-INDIRECT
| AUTO-INDIRECT | HOME-EQUITY-PRODUCTS | DEPOSITS |
| BUSINESS RULES | APR RULES |

SELECT APR RULES

☑ CREATE NEW RULESET — 118
NEW RULESET NAME [          ] RULE 1 — 120

| ATTRIBUTE | ATTRIBUTE NAME | RULE TYPE — 122 | |
|---|---|---|---|
| | AGE | GAP | RATE INCREASE WITH EXACT GAP |
| | FICO | PRICING | RATE INCREASE WITH MINIMUM GAP |
| | TERM | PARTITION GAP | RATE INCREASE WITH MINIMUM GAP |
| | | NONE | |

APR VALUES FOR PRICING ATTRIBUTE SELECTED ABOVE — 128  130

| ATTRIBUTE GROUPS | ATTRIBUTE RANGES | GAP VALUES (IN BP: BASIS POINTS) |
|---|---|---|
| APR: MY | 2000 TO 2001 | 5 |
| APR: MY | 2001 TO 2002 | 5 |
| APR: MY | 2002 TO 2003 | 5 |
| APR: MY | 2003 TO 2004 | 5 |
| APR: MY | 2004 TO 2005-2006 | 5 |

134  126

[ SAVE ]   [ DELETE ]

LOGOFF    MESSAGE: 0 OF 0

| FILE | PREFERENCES | HELP | | | USER: TEST ALL TEST ALL |
|---|---|---|---|---|---|

PRICE ACTIVITY CALENDAR
BUSINESS RULES LIBRARY
ADMINISTRATION & CONFIGURATION
PROCESSING

AUTO-INDIRECT
| AUTO-INDIRECT | HOME-EQUITY-PRODUCTS | DEPOSITS |
| BUSINESS RULES | APR RULES |

SELECT APR RULES

☑ CREATE NEW RULESET — 118
NEW RULESET NAME — 120       RULE 1

ATTRIBUTE — 134

| ATTRIBUTE NAME | | RULE TYPE | | RATE MOVEMENT DIRECTION | |
|---|---|---|---|---|---|
| AGE | | GAP | ⊙ | RATE INCREASE WITH EXACT GAP | ⊙ |
| FICO | | PRICING | ⊙ | RATE INCREASE WITH MINIMUM GAP | ⊙ |
| TERM | | PRICING | ⊙ | RATE INCREASE WITH MINIMUM GAP | ⊙ |

— 122

APR VALUES FOR PRICING ATTRIBUTE SELECTED ABOVE

| ATTRIBUTE GROUPS | ATTRIBUTE RANGES | GAP VALUES (IN BP: BASIS POINTS) |
|---|---|---|
| APR: MY | 2000 TO 2001 | 5 |
| APR: MY | 2001 TO 2002 | 123 |
| APR: MY | 2002 TO 2003 | 5 |
| APR: MY | 2003 TO 2004 | 5 |
| APR: MY | 2004 TO 2005-2006 | 5 |

126  128  130  138

SAVE    DELETE

LOGOFF

MESSAGE: 0 OF 0

| | | | | | | | 
|---|---|---|---|---|---|---|
| STRUCTURE | /FSPO /FST_OPT_PRICE | | ACTIVE | | | |
| SHORT DESCRIPTION | INTERFACE TO COMPUTE INITIAL PRICE RANGE FOR OPTIMIZATION | | | | | |

ATTRIBUTES / COMPONENTS / ENTRY HELP / CHECK / CURRENCY / QUANTITY FIELDS

1/5

| COMPONENT | RT | COMPONENT TYPE | PREDEFINED TYPE | DATA TYPE | LENGTH | DECI... | SHORT DESCRIPTION |
|---|---|---|---|---|---|---|---|
| PRODUCT KEY | □ | | | INT4 | 10 | 0 | PRODUCT KEY |
| RESERVED | □ | | | INT4 | 10 | 0 | FOR FUTURE USE |
| RATE MIN | □ | | | FLTP | 16 | 16 | MINIMUM RATE FOR OPTIMIZATION |
| RATE CURR | □ | | | FLTP | 16 | 16 | RATE AT START OF OPTIMIZATION |
| RATE MAX | □ | | | FLTP | 16 | 16 | MAXIMUM RATE FOR OPTIMIZATION |

142 — PRODUCT KEY
144 — RESERVED
146 — RATE MIN / RATE CURR
148 — RATE MAX
150 — PREDEFINED TYPE
152 — DECI...
154 — (table extent)

| | FILE | PREFERENCES | HELP | | | USER: JORDAN CEO |
|---|---|---|---|---|---|---|
| PRICE ACTIVITY CALENDAR | ACTIVITY CALENDAR | | | | | |
| | CALENDAR | | | | 156 | |
| BUSINESS RULES LIBRARY | | DESCRIPTION | | STATUS | ACTIVITY TYPE | |
| ADMINISTRATION & CONFIGURATION | | | | ALL | ALL | 2001 0 5 |
| PROCESSING | | USER GUIDE PRICE EVENT | | OPEN | AUTO-INDIRECT | |
| | | PAD TEST | | OPEN | AUTO-INDIRECT | |
| | | NEW TEST | | OPEN | AUTO-INDIRECT | |
| | | AAA | | OPEN | AUTO-INDIRECT | |
| | | HEPA | | OPEN | HOME-EQUITY-... | |
| | | SUCKER | | OPEN | AUTO-INDIRECT | |
| | | STILL GOING? | | OPEN | AUTO-INDIRECT | |
| | | ERROR TEST | | OPEN | AUTO-INDIRECT | |
| | | SAPIEN TOTAL TEST | | OPEN | AUTO-INDIRECT | |
| | | ERROR 6 | | APPROVED-FM | AUTO-INDIRECT | |
| | |◁◀▷▶▷▶| PAGE [1] /4 [GO] | | CREATE  DETAIL | DELETE |
| | DETAILS | | | | ─158 | |
| | INFO \| TOTALS | | | | | |
| | DESCRIPTION | | APR RULESET NAME | STATUS LIFE-CYCLE | | |
| | USER GUIDE PRICE EVENT | | AI RULESET | | | |
| | STATUS | CREATED BY | RATE MOVEMENT NAME | STATUS: OPEN | | |
| | OPEN | CINDY SAPIEN | 10/10 | | | |
| | APPROVED BY DATE | DELIVERY DATE | | STATUS: DELIVER | COMMIT | |
| | 05/09/2007 ☐ | 05/10/2007 ☐ | | | | |
| | EFFECTIVE DATE | END DATE | | | | |
| | 05/11/2007 ☐ | 06/08/2007 ☐ | | | | |
| | PREVIOUS FUNDED BY DATE | | | | | |
| | 05/17/2007 ☐ | APPLY RESET | | | | |
| LOGOFF | | | MESSAGE: 0 OF 0 | | | |

PRODUCT SPACE

METHOD AND SYSTEM INCORPORATING BUSINESS RULES AND PRICE OPTIMIZATION FOR FINANCIAL SYSTEM

FIELD OF THE INVENTION

The present invention relates in general to economic modeling and, more particularly, to a system and method for optimizing key performance indicators when determining the pricing of products offered by financial institutions.

BACKGROUND OF THE INVENTION

Economic and financial modeling and planning is commonly used to estimate or predict the performance and outcome of real systems, given specific sets of input data of interest. A model is a mathematical expression or representation which predicts the outcome or behavior of the system under a variety of conditions. In one sense, it is relatively easy, in the past tense, to review historical data, understand its past performance, and state with relative certainty that the system's past behavior was indeed driven by the historical data. A much more difficult task, but one that is extremely valuable, is to generate a mathematical model of the system which predicts how the system will behave, or would have behaved, with different sets of data and assumptions. While forecasting and backcasting using different sets of input data is inherently imprecise, i.e., no model can achieve 100% certainty, the field of probability and statistics has provided many tools which allow such predictions to be made with reasonable certainty and acceptable levels of confidence.

In its basic form, the economic model can be viewed as a predicted or anticipated outcome of a mathematical expression, as driven by a given set of input data and assumptions. The input data is processed through the mathematical expression representing either the expected or current behavior of the real system. The mathematical expression is formulated or derived from principles of probability and statistics, often by analyzing historical data and corresponding known outcomes, to achieve a best fit of the expected behavior of the system to other sets of data, both in terms of forecasting and backcasting. In other words, the model should be able to predict the outcome or response of the system to a specific set of data being considered or proposed, within a level of confidence, or an acceptable level of uncertainty.

Economic-based models have numerous variables and influences which determine its behavior. For example, in the case of home equity loans and lines of credit, some common rules are: (1) maximum rate change per cell not to exceed predefined limit per pricing cycle; (2) maximum rate not to exceed predefined values; (3) no price differentiation by channel; (4) no price differentiation between $2^{nd}$ and $3^{rd}$ liens; (5) for fixed rate products, rates have a consistent gap between FICO (Fair Isaac Corporation) and term tiers within a dollar tier; (6) no rate differentiation between home equity loan prices and fully amortizing fix rate loan option prices (for similar parameters); (7) each product cell has a positive net present value of performance; (8) each product cell has a risk-adjusted return on capital not lower than a predefined level; and (9) portfolio of home equity line of credit for $2^{nd}$ liens have a minimum return on tangible equity(ROTE) of predefined level and a minimum risk-adjusted return on capital of a predefined value.

For an accurate model, these business rules must be considered during the optimization cycle. In doing so, the first problem encountered is how to describe and build an intelligent network that maps multitude of rules spanning millions of rate cells into a minimally defined structure communicating to the optimization system. Often there is also a severe scarcity of available information at the rate cell level to base an optimized rate recommendation independent of whether the product contributes to the financial institution's key performance indicators.

A need exists for a method to effectively model a wide class of business rules, allowing financial institutions to maintain a multitude of rate cells while optimizing their key performance indicators.

SUMMARY OF THE INVENTION

In one embodiment, the present invention is a computer implemented method of determining an optimized rate value of a target product in a financial system, comprising providing a plurality of products in the financial system, defining a first attribute having a first attribute value for each of the plurality of products, wherein the first attribute is a criteria that impacts a rate value of the plurality of products, defining a first associated product rule, the first associated product rule being a linear rule between two of the plurality of products, optimizing the first associated product rule to produce an optimized scenario, wherein optimizing comprises applying the first associated product rule to two of the plurality of products which actively contributes to a key product indicator, performing densification to infer the rate value for each of the plurality of products which do not actively contribute to the key product indicator, and, relaxing a starting rate of one of the plurality of products where the starting rate violates the first associated product rule, and recommending the optimized rate value for the target product to achieve a target in the optimized scenario, wherein the target includes a profit value and a sales volume value.

In another embodiment, the present invention is a method of providing a computer model of an optimized rate value of a target product in a financial system, comprising providing a plurality of products in a financial system, providing a first attribute having a first attribute value for each of the plurality of products, wherein the first attribute is a criteria that impacts a rate value of the plurality of products, providing a first associated product rule, the first associated product rule being a linear rule between two of the plurality of products, solving an optimizing process using the first associated product rule, wherein the optimizing process comprises transforming the first associated product rule into a first mathematical formula, applying the first associated product rule to two of the plurality of products which actively contributes to a key product indicator, performing densification to infer the rate value for each of the plurality of products which do not actively contribute to the key product indicator, and relaxing a starting rate of one of the plurality of products where the starting rate violates the first associated product rule, and providing a recommendation for the optimized rate value of the target product to achieve a target in the optimized scenario, wherein the target includes a profit value and a sales volume value.

In yet another embodiment the present invention is a computer program product usable with a programmable computer processor having a computer readable program code embodied therein, comprising, computer readable program code which provides a plurality of products in a financial system, computer readable program code which provides a first attribute having a first attribute value for each of the plurality of products, wherein the first attribute is a criteria that impacts a rate value of the plurality of products, computer readable program code which provides a first associated product rule, the first associated product rule being a linear rule between two of the plurality of products, computer readable program code which solves an optimizing process using the first associated product rule, wherein the optimizing process comprises computer readable program code applying the first associated product rule to two of the plurality of products which actively contributes to a key product indicator, computer readable program code performing densification to infer the rate value for each of the plurality of products which do not actively contribute to the key product indicator, and computer readable program code relaxing a starting rate of one of the plurality of products where the starting rate violates the first associated product rule, and computer readable program code which creates a graph of the optimized scenario that can be used for recommending the optimized rate value of a target product to achieve a target in the optimized scenario, wherein the target includes a profit value and a sales volume value.

BRIEF DESCRIPTION OF THE DRAWINGS

FIGS. 4a-4d illustrate a graphical user interface for defining associated product rules;

FIGS. 5a-5b illustrate a graphical user interface for defining cell-level rules;

FIGS. 6a-6d illustrate a graphical user interface for initiating the optimization process and viewing the results;

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

The present discussion considers economic modeling as applied to financial institutions. In particular, understanding the relationships between products offered by a financial institution, such as a home equity loan or other line of credit, and the unique combination of attributes which determine the price of those products. For example, determining the price of a home equity loan can include a unique combination of factors such as loan type, region, distribution channel, lien position, combined loan to value ratio (CLTV), balance tier, term range, FICO score, and custom score. While the rich variety of attributes provide the benefits of a well-balanced portfolio and price differentiation, it also adds to the complexity of maintaining the vast quantity of combinations of rate cells that need to be regularly monitored and updated. The present system addresses how to effectively model a wide class of business rules and allows financial institutions to maintain a multitude of rate cells while optimizing their key performance indicators.

Figure 1:
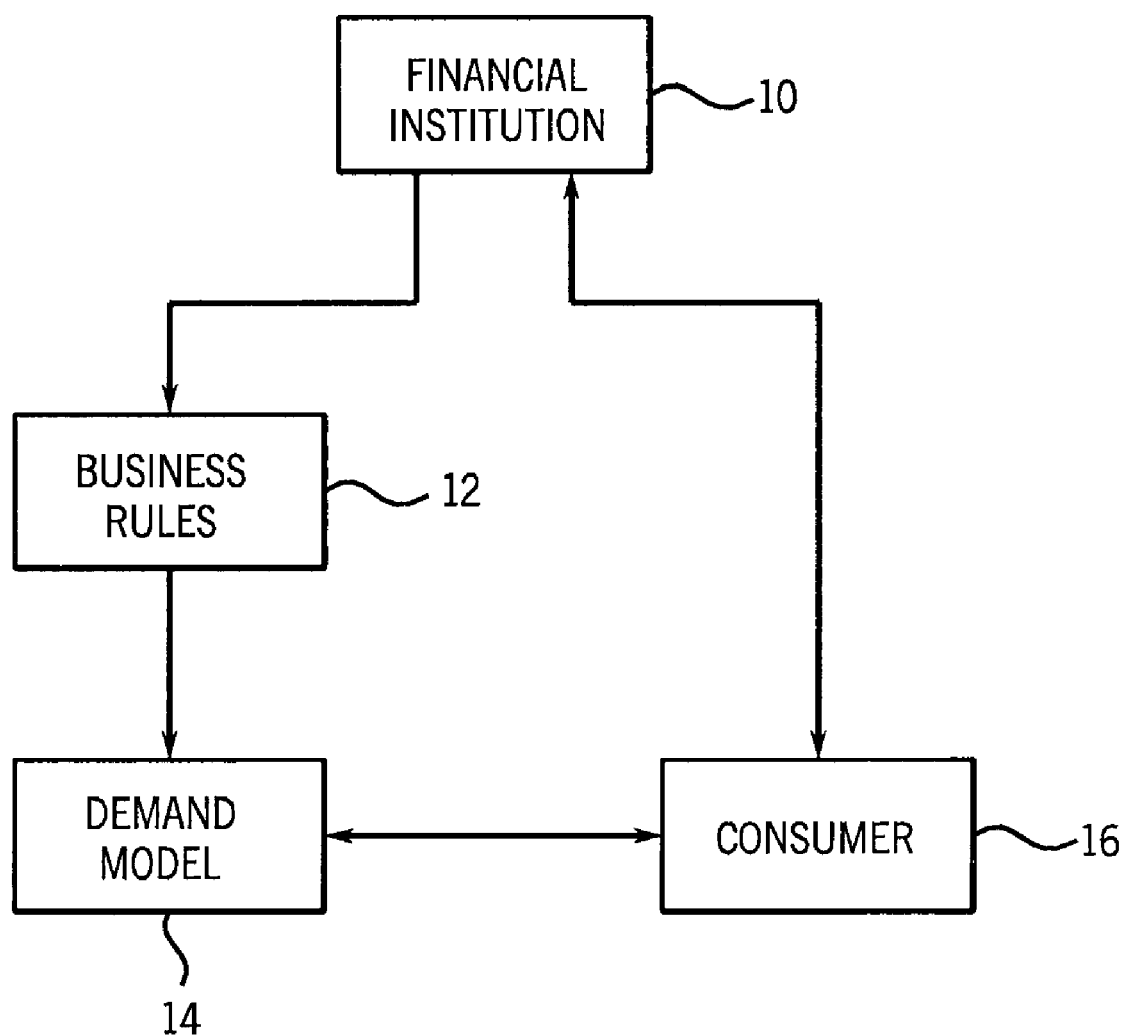
FIG. 1 is a high level illustration of the relationship between a financial institution, an embodiment of a price optimization for banking (POB) system, and a customer.

FIG. 1 is a high-level illustration of the relationship between a financial institution, an embodiment of a price optimization for banking (POB) system, and a customer. The financial institution 10 is any entity that provides financial services for a customer 16. Financial institution 10 is commonly a bank, building society, credit union, stock brokerage, asset management firm or similar business and offers such products as loans, certificates of deposit, underwriting, securities and other financial services.

When customer 16 approaches financial institution 10 for a product, financial institution 10 applies multiple business rules 12 to the information obtained from customer 16 and outside sources. Business rules 12 may be defined by financial institution 10 or a regulatory agency and thus, may be mandatory for all similar transactions regardless of the service provider or may be specific to financial institution 10. Business rules 12 assist financial institution 10 in maximizing its key performance indicators, meeting strategic objectives, and fulfilling legal obligations.

Demand model 14 represents the application of business rules 12 to a portfolio of products to determine the optimized rates. Demand model 14 analyzes the data to predict demand or other attributes (price, promotion, merchandizing) of subsequent sales transactions. These optimized rates are used by financial institution 10 in selling the product sought by customer 16. However, the relationship shown in FIG. 1 also illustrates that customer 16 affects the demand model. By purchasing financial products, customer 16 affects the data relating to the portfolio of products offered by financial institution 10. Products purchased (and not purchased) by customer 16 affect key performance indicators, the overall profit and volume of sales, as well as other product information. As will be subsequently discussed, this impacts the optimized rates that result from the demand model.

The rules which apply to any product are defined by the product's attributes. Attributes are any criteria that could impact a product. Examples of attributes for a loan product include FICO scores, CLTV, and loan terms. Each product attribute is associated with a value or range of values. A product can, therefore, be described as a set of attribute values. Thus, in a POB system, a financial institution may specify that for a given product, all other attributes being equal, the optimized rate should decrease as the FICO attribute increases. Additionally, the financial institution may specify that the difference in rates between ranges of FICO scores should be at most, or at least, or exactly, a certain amount. In other words, the rule may be specified as: "the rate of products with higher FICO attribute score must be lower than the rate of products with lower FICO attribute score." The generation of the rules translates such specifications into appropriate mathematical rules for products actively contributing to key performance indicators.

The rules take two forms, either associated product rules or cell-level rules. Associated product rules are linear rules, or rules that are reducible to a linear form, between the rates of two products. Associated product rules include rules such as "rate of products with 750 FICO<(less than) rate of product with 700 FICO" and "rate of products with 60 month loan<rate of product with 66 month loan." Associated product rules are subsequently discussed in detail.

Cell-level rules provide constraints on a single attribute of a product cell that contributes to the key performance indicators. For example, a cell-level rule could provide: "return on Assets (ROA)>(greater than) 0 for all products." Each product has a multiple of key performance indicator-driven properties. For example, loans have: yield (effective net return), ROA, capital allocation (a measurement of funding risk), and return on equity (ROE). In addition, cell-level rules address the rules regarding the minimum and maximum bounds of the rate cell. Bounds can be defined in absolute terms or pegged to a dynamic index or competitor's rates. Cell-level rules are subsequently discussed in detail.

The difference between the rules can be illustrated mathematically as follows:

ASSOCIATED PRODUCT RULE: $r_1 < r_2$;

CELL-LEVEL RULE: $f(r_1) > 0$.

Figure 2:
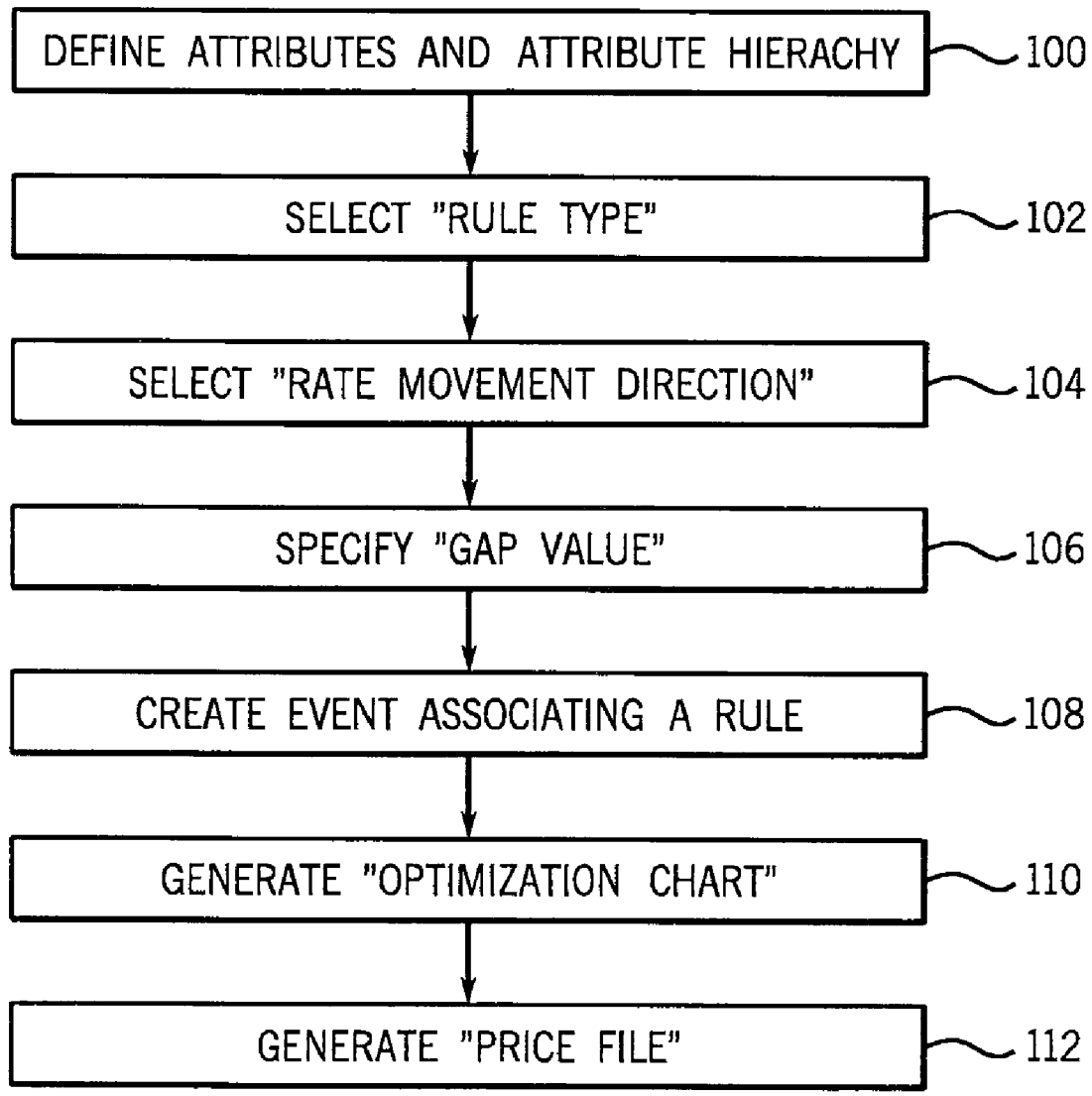
FIG. 2 illustrates the user-initiated processes involved in a POB system where the POB system is implemented as a computer program with a user interface.

FIG. 2 illustrates the user-initiated processes involved in a POB system where the POB system is implemented as a computer program with a user interface. The first four steps relate to defining associated product rules and include: step 100 (defining the attribute list and hierarchy), step 102 (selecting the rule type), step 104 (selecting a rate movement direction), and step 106 (specifying a gap value). Steps 100 through 104 are repeated for every associated product rule that is created. Each of these steps is subsequently discussed in detail.

First, step 100 requires the attributes and attribute hierarchy of the associated product rules to be defined. Again, a product is a financial instrument identified by a unique combination of attribute values or ranges, the attributes being any criteria that could impact the rate of the product. Attributes are organized in a hierarchal structure where the presence of a parent attribute determines the value of child attributes. Thus for a given product, a value of 700 for a parent attribute may determine that a child attribute must have a value of 60, where as a value of 500 for the same parent attribute would mean the value of the same child attribute is 80. The values or ranges of the child attribute can be viewed as categorized into different partitions based on the value of parent attributes.

Figure 3:
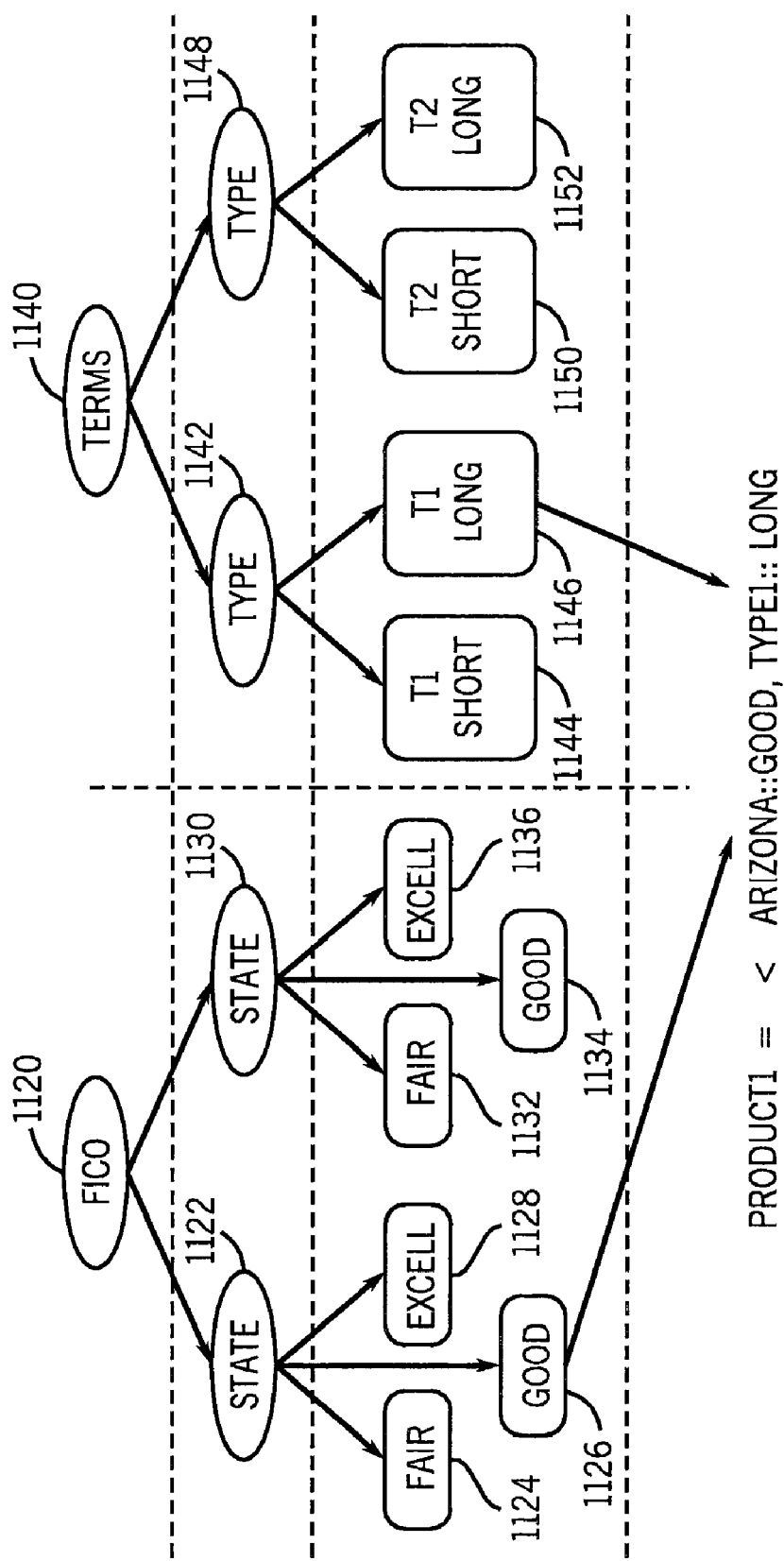
FIG. 3 illustrates the concept of attribute hierarchy and partitions.

FIG. 3 illustrates the concept of attribute hierarchy and partitions. For the example product, associated product rules need to be generated based on FICO scores and terms. Looking first at FICO score 1120, the parent attribute is the state and can have a value of state 1122 or state 1130. States 1122 and 1130 are associated with the child attributes for fair, good, and excellent, but the values of these child attributes may be different. For example, state 1122 may be Arizona and state 1130 California. What values are considered fair 1124, good 1126, and excellent 1128 for a FICO score in Arizona may be different than what is considered fair 1132, good 1134, and excellent 1136 in California. Similarly, the parent attributes for term 1140 is the type of the term. If term 1140 is of type 1142, then particular values of T1 short 1144 and T1 long 1146 apply. These values may be different from the values of T1 short 1150 and T2 long 1152 had term 1140 been of type 1148.

Only rules for products having attribute values within the same partition are generated. For FIG. 3, this would mean there are no rules between the attributes of products in state 1122 and products in state 1130. Likewise, there are no rules between a product having a term of type 1142 versus a term of type 1148. Due to the partition structure, in order to support rules for a product such as "rates shall not increase as FICO attribute increases," the sequential increasing order for all FICO attribute values within the same partition needs to be separately defined.

FIG. 4a shows a user interface for defining associated product rules. Section 116 of user interface 114 is broken into three columns for defining each attribute used in an associated product rule: column 118 (attribute name), column 120 (rule type), and column 122 (rate movement direction). Section 124 also has three columns for defining the values of attributes created in section 116: column 126 (attribute group), column 128 (attribute ranges), and column 130 (gap values). Each of these parameters will subsequently be discussed in detail. The hierarchy for the user interface is generally defined at the database level using additional software tools, such as one or more of SAP's Business Intelligence (BI) software applications. The attributes are, accordingly, part of a data set stored in the database system. Step 100, therefore, which requires the attributes and attribute hierarchy of the associated product rules to be defined, has visibility to all the attributes and underlying hierarchies as defined in the database system.

Returning to FIG. 2, in step 102 a rule type is selected for each attribute defined in step 100. Three different types of associated product rules are recognized: inequality rules (also called inequality associated product rules), equality rules (also called equality associated product rules), and partition rules. Both inequality and equality rules define constraints on the product rates. Inequality rules require that the rate of one product is less than or greater than the rate for another product within the attribute hierarchy. Such rules may be expressed as "$r_1 < r_2 \pm \alpha$," where $\alpha$ is a range over which the rule applies, also called a gap value, and ± presents the direction or the sign of the gap value, either negative or positive. Equality rules require the rate for one product to be the same as a rate for another product within the attribute hierarchy. Such rules may be expressed as "$r_1 = r_2 \pm \alpha$," where $\alpha$ is a gap value and ± presents the direction or the sign of the gap value, either negative or positive. Lastly, partition rules are rules that separate the products into groups which have no cross-group rules.

The three types of associated product rules are related to specific kinds of attributes. There are four kinds of attributes used in associated product rules: pricing attributes, gap attributes, partitioning attributes, and descriptive attributes. Pricing attributes are relevant for creating inequality rules. Gap attributes are used in equality rules. Partitioning attributes are those products separated into different sets, across which no rules are generated. Finally, descriptive or none-attributes have no effect on the rule generation process and are included for explicitly specifying attributes that have no affect on the rule generation. Descriptive attributes for one rule can be attributes of another kind in another rule.

If attributes and an attribute hierarchy are defined in step 100, then in step 102 these attributes can be designated as applying to equality or inequality type rules. For example, a FICO attribute and related attribute hierarchy are defined at step 100. When a FICO score is defined as a pricing attribute in step 102, an inequality rule must result because two otherwise identical products that are differentiated only by the value of their FICO attribute have different rates. Alternatively, a sales channel can be a gap attribute. When a sales channel is defined as a gap attribute, an equity rule must result as products that differ only by sales channels have the same rate.

Partition rules result from partition attributes such as market group or product type. Thus, when a market group is defined as a partition attribute it must result in a rule which prevents inequality or equality rules from being applied across the market group partition. This is because similar products sold in different markets may have different rates. Some attributes could be different attribute types depending on their use. Thus, the association of a rule type for a defined attribute ensures the generation of the correct type of rule.

FIG. 4b illustrates how the user interface 114 is used to associate attributes with inequality, equality, or partition type associated product rules. First, box 134 is checked to signal that a new rule set is being created. Each attribute to be defined is given a name in column 118. In the illustration, the three example attributes have been named: AGE, FICO, and TERM. In column 120, a drop-down list 132 is used to select the type of attribute entered in column 118 as either pricing, partition, gap, or none (for example, descriptive). As stated above, attribute type corresponds directly with the type of associated product rule and, therefore, defining the attribute type also defines the rule type. Attribute groups 126 are the leaf nodes defined in the attribute hierarchy. Attribute ranges 128 are the ranges of the attribute values for each attribute group 126. FIG. 3, for example, shows the FICO and TERMS hierarchy. For FICO attributes, the hierarchy has six attribute groups: fair 1124, good 1126, and excellent 1128 for state 1122, and fair 1132, good 1134, and excellent 1136 for state 1130. Each attribute group has an attribute range that defines the possible range of values. For example, excellent 1128 or excellent 1136 may be defined as a FICO score greater than 700.

Returning to FIG. 2, in step 104 the direction of any change in the rate is selected, if applicable. As the value of an attribute increases, the rates defined by the associated rule may linearly increase or decrease in value or stay constant. There are four directions for rate movement: rate increase with a minimum gap, rate decrease with a minimum gap, rate increase with an exact gap, and rate decrease with an exact gap. Rate increases or decreases with a minimum gap are used with pricing attributes whereas rate increases or decreases with an exact gap are used with gap attributes. The actual value of the gap is specified in step 106.

Figure 4C:
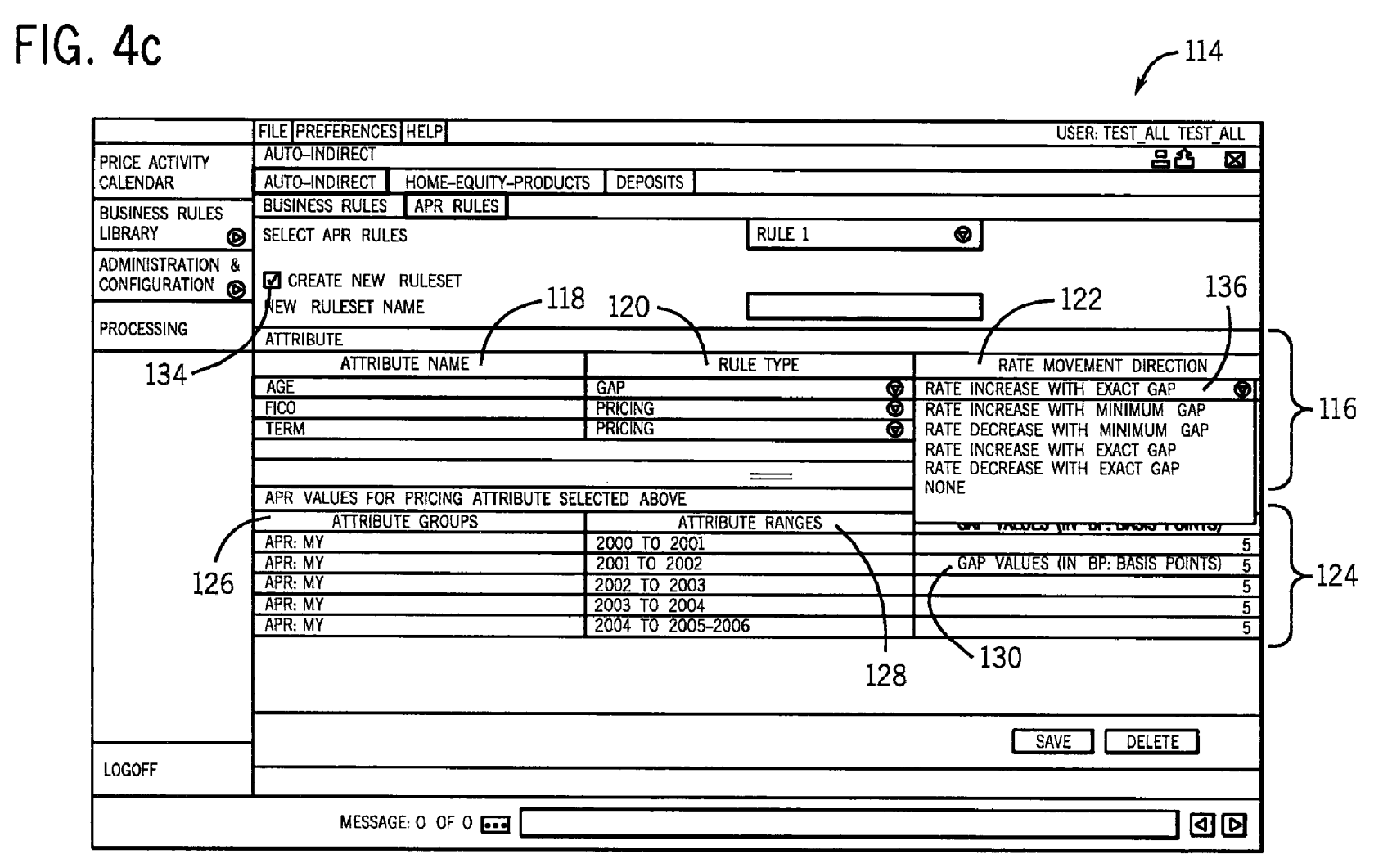

FIG. 4c illustrates how the user interface 114 is used to select the direction of any change in the rate for the three example attributes column 118. In column 122, a drop-down list 134 is used to select the direction of the rate movement for the attribute entered column 118 as either: rate increase with minimum gap, rate decrease with minimum gap, rate increase with exact gap, rate decrease with exact gap, or none.

FIG. 4d illustrates the specification of the gap value. In column 130 the gap values are set as a default to 5. As shown in row 123, the default gap value can be changed by typing in a new number (shown here as a value of 123). Attribute groups 126 and attribute ranges 128 may be set when the user creates the attribute hierarchy.

As previously discussed, cell-level rules can also be used by the optimization procedure and they may be defined either before or after defining the associated product rules. Cell-level rules address the minimum and maximum bounds allowed in a rate cell. These bounds can be defined in absolute terms or tied to a dynamic index or competitor's rates.

Figure 5A:
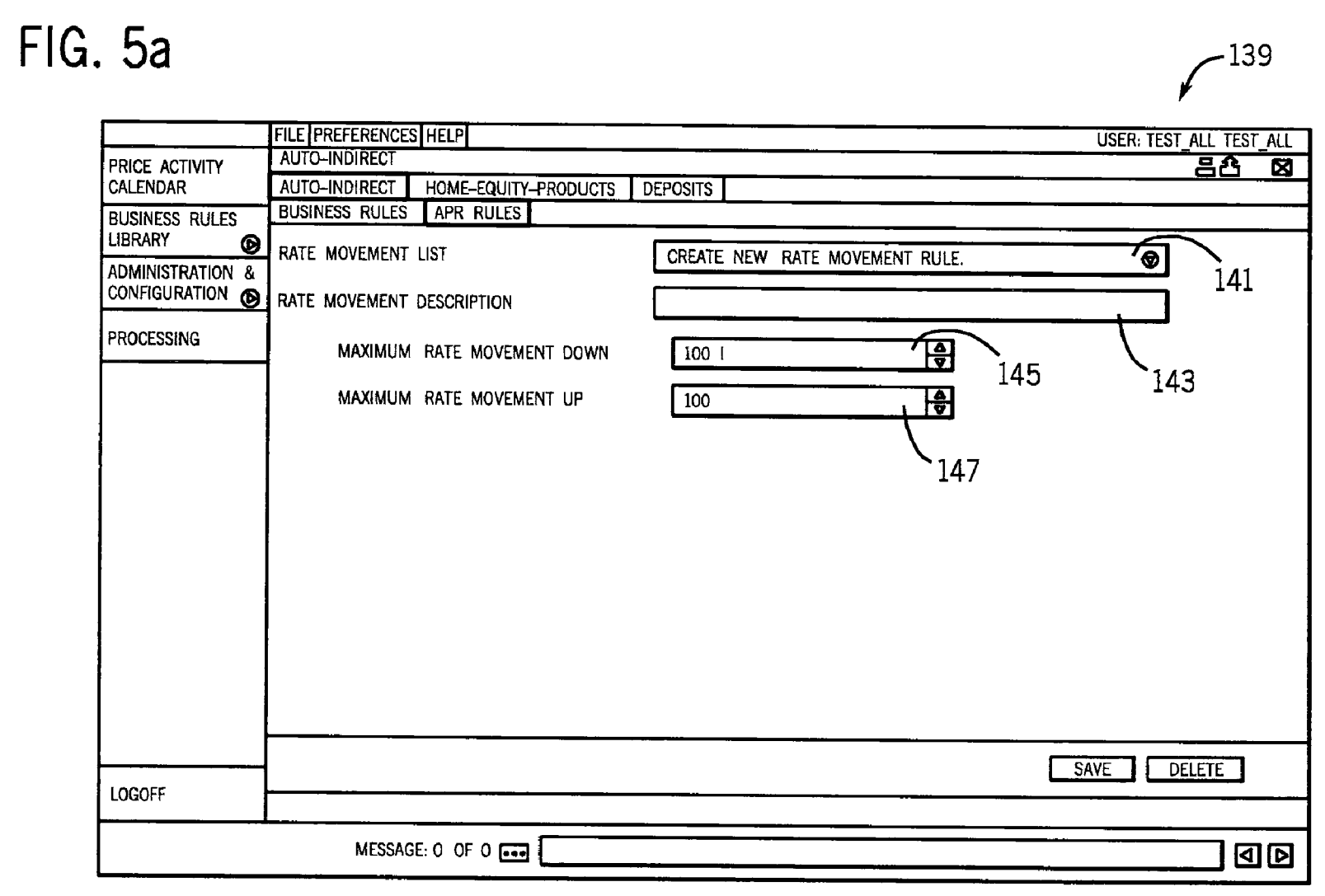

FIG. 5a illustrates a graphical user interface 139 for the input of a default cell-level rules (CLR) configuration. Users can enter the default maximum and minimum values for all products using the interface. Accordingly, each product may be assigned a CLR that defines minimum and maximum allowed rate values. For example, a user may create a new rate movement rule 141, provide a description 143 of the rule, and enter maximum values for rate movement down 145 and rate movement up 147.

FIG. 5b illustrates a program functional interface 140 for defining CLR on a product level through the use of underlying complimentary functional calls available upon client request. Four parameters are defined for each cell-level rule: product key 142, current rate (rate at the start of the optimization) 146, minimum rate for optimization 144, and maximum rate for optimization 148. Columns 150, 152, and 154 represent data type, length, and precision of underlying data types correspondingly and are supplied for user convenience. Column 152 defines the value length and column 154 defines the value's precision, neither are generally editable. The user may customize their CLR through the program interface by performing calculations on current rate, minimum rate, and maximum rate through complimentary function calls.

Once each rule has been defined, sets of rules can be associated with a created event in step 108. Events are defined as any use of the POB system for a particular optimized result. For example, determining the optimized rate of products in a particular market segment. Many events are repeatedly optimized. To prevent users from having to create and select the same rules each time the POB system is used, an event is created which simply associates one or more rules for a particular optimized result. For subsequent uses of the POB system, a prior-created event can be chosen and the rules for that event will already be created and selected for optimization.

Figure 6B:
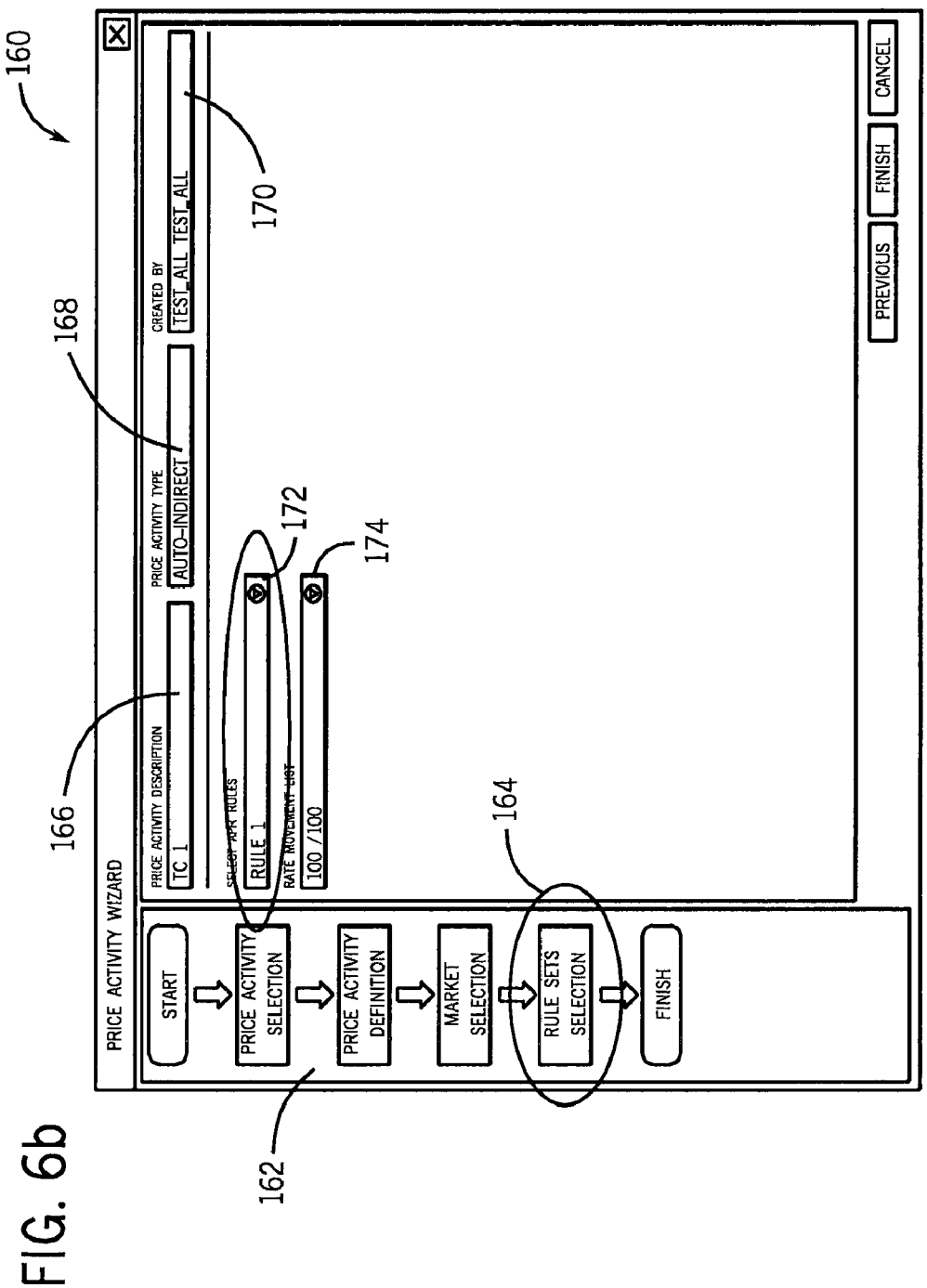

FIG. 6a illustrates the first graphical user interface 156 for associating rules with an event. By clicking the create button 158, a user interface called a wizard appears to guide users in defining the configuration for the optimization process. FIG. 6b illustrates wizard 160. Panel 162 shows where in the process the user is. During the rule set selection step 164, input boxes for price activity description 166, price activity type 168, and created by 170 are presented. By using the input boxes an event can be defined. Input box 166 is the description for the price activity. Input box 168 is the line of business selected for rate optimization, for example, home equity products or deposits, and box input box 170 may contain the user ID of the user that created the price activity. A drop down list 172 is used to select from rules defined in FIGS. 4a-4d, the selection associating the rule with the event defined. Drop down list 172 lists the defined default CLR for all products. The default CLR generally includes two numbers, such as 80/100, wherein the value 80 is the range for movement down (the optimizer can move a product price down by a value of up to 80) and the value 100 is the range for movement up (the optimizer can move a product price up by a value of up to 100).

Figure 6C:
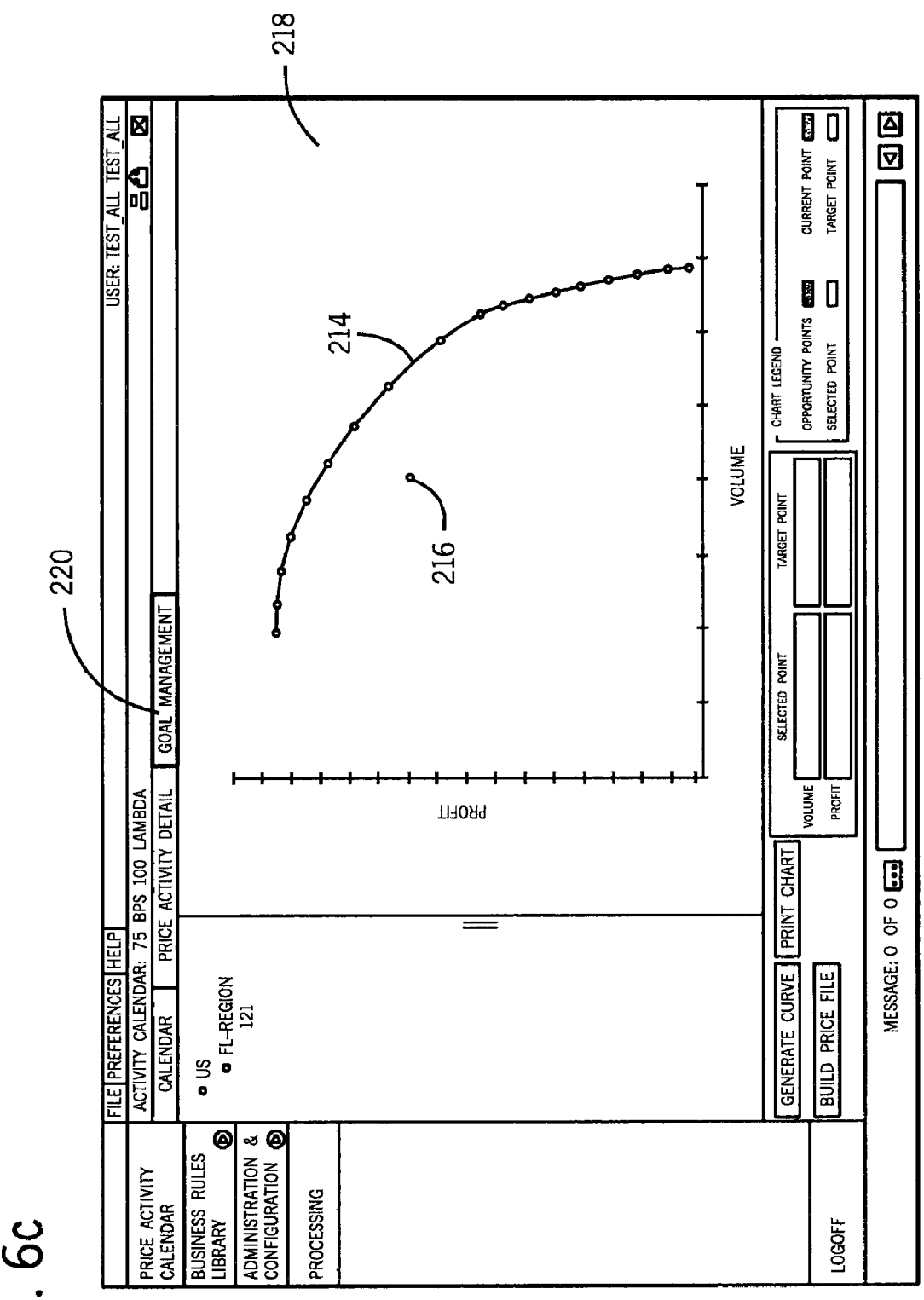

Returning to FIG. 2, an optimization chart can be generated in step 110 from the data created in the optimization process. In FIG. 6c, the goal management tab 220 is used to view the optimization chart. The relationship between profit and volume for a product portfolio is shown as curve 214. From a business point of view, profit and volume of sales are trade-off characteristics. An increase in a product's profit margin can correlate to a decrease in the number of customers willing to purchase the product. To gain customers, the financial institution might need to seek less profit. Financial institutions can use the optimization chart to find a target point 214 where both profit and total volume of sales match their strategic and business objectives.

Figure 6D:
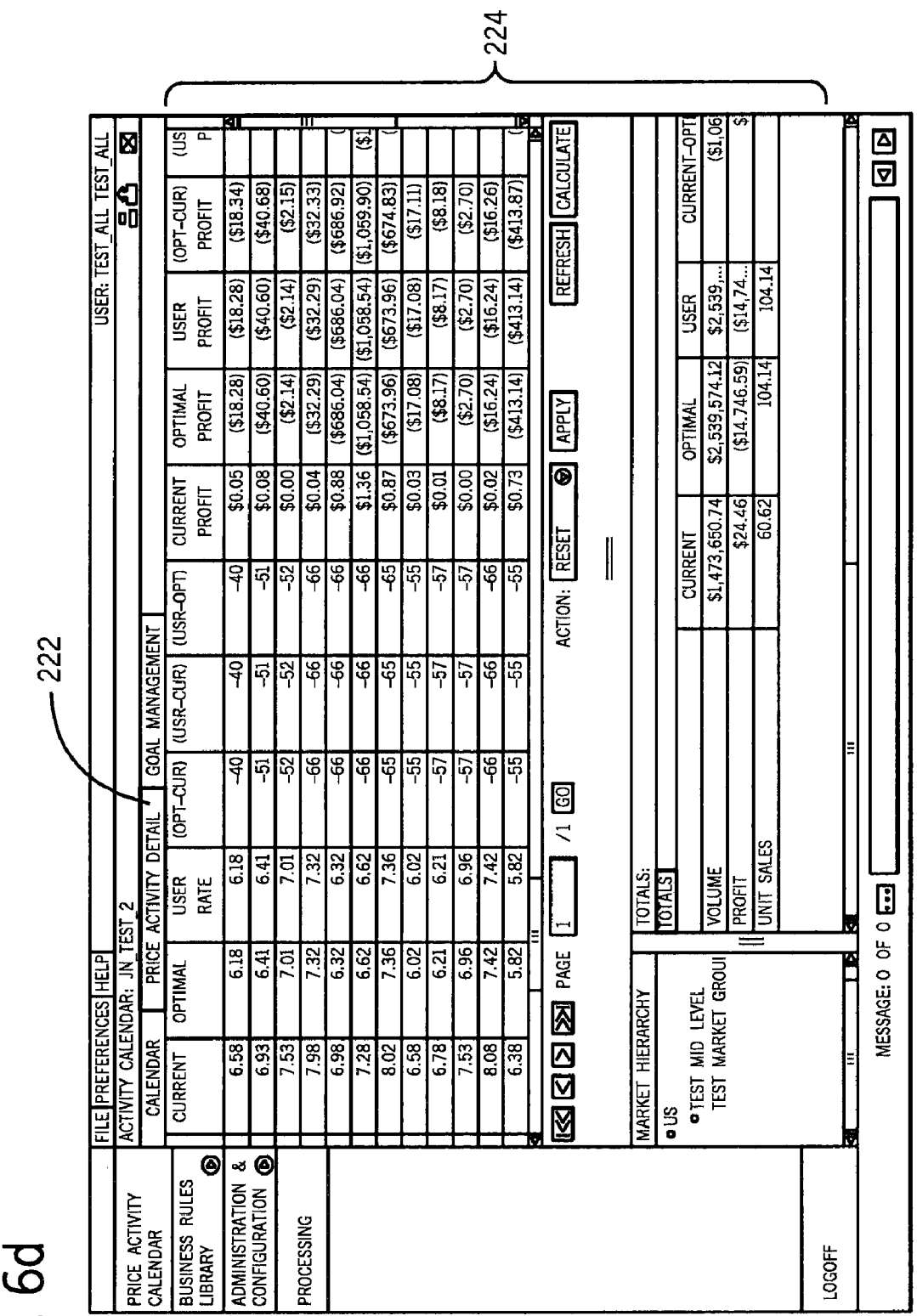

Finally, in FIG. 2, a user may generate a price file in step 112. By selecting a point along curve 214 of the optimization chart shown in FIG. 6c, a price file is generated. In FIG. 6d, the price activity tab 222 is used to view the detailed price file 224. Price file 224 provides values needed for the profit margin, volume of sales, rates, and other factors for each product in the portfolio to achieve the overall profit and total volume of sales of the point selected.

The inputted rules must be translated to mathematical rules for use in the optimization process. As stated, a given product is defined as a set of attributes and associated values. Thus, if a product has n attributes, the product is a n dimensional vector: product=<$V_1, V_2, \ldots, V_n$> where V represents the value of attribute n. The POB system limits the maximum number of attributes for all products to 13, not including descriptive attributes.

Each attribute has an index (1 to Max) and the following definitions: attribute value set (AVS), attribute axis set (AXIS), product space, and cutoff zone. The AVS is all of the values or value ranges for an attribute within the same partition. An AXIS is a unique, sorted, non-associative container where the AVS is organized in sequential order. Product space defines all the possible products, including those products that do not have a market offering (rate cell). Thus, a product set comprised solely of existing products is a subset of the product space including only those existing products which have a market offering. Similarly, an active product set is a further subset of only those existing products contributing to key performance indicator values (i.e., top selling products). The cutoff zone includes all the non-active or non-existing products in the product space. Thus, for attribute i the following definitions could apply:

$AVS_i$={attribute values(AV)};

$AXIS_i$=[$AV_1 < AV_2 < \ldots < AV_n$]|$AV_i \in AVS_i$;

product space={[$AV_1, AV_2, \ldots, AV_n$]|$\forall AV_i$: $AV_i \in axis_i$};

cutoff zone={inactive product=[$AV_1, AV_2, \ldots, AV_n$] |inactive product; product space∪inactive product⊄product set}.

Figure 7:
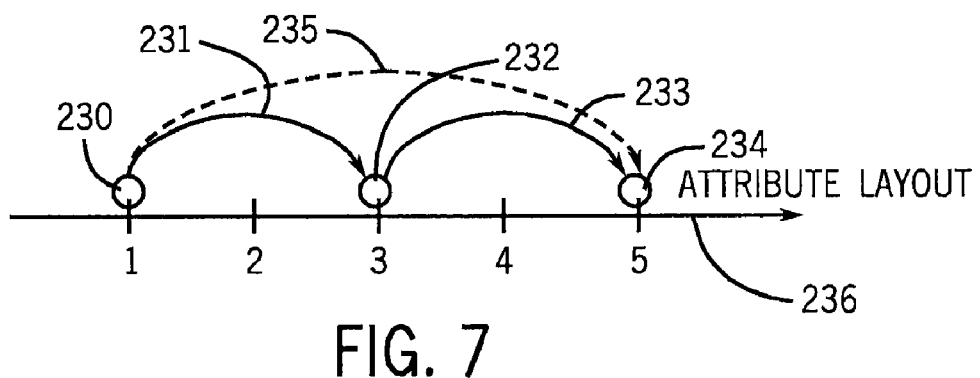
FIG. 7 is an attribute layout graphically showing the relationship between $AVS_i$, $AXIS_i$, product space, and cutoff zone for an attribute i.

FIG. 7 is an attribute layout graphically showing the relationship between AVS, AXIS, product space, and cutoff zone for an attribute i. $AXIS_i$ 236 illustrates the $AVS_i$ in sequential order. Three active products are identified (230, 232, and 234) with five attribute values (<1>, <2>, <3>, <4>, and <5>). Thus, for attribute i, product 230=<1>, product 232=<3>, and product 234=<5>. Attribute values <2> and <4> do not correspond to active products.

The optimization process only considers rules corresponding to active products, ignoring those for non-active or non-existing products. If $AXIS_i$ 236 had to be followed sequentially the attribute layout shown in FIG. 7 would yield a rule chain of: $r_1 < r_2 < r_3 < r_4 < r_5$. The associated product rules would connect values 1→2, 2→3, 3→4, and 4→5. Since the non-active or non-existing products corresponding to values <2> and <4> are ignored during optimization, all rules will be ignored resulting in the loss of functionality required to preserve rules $r_1 < r_3 < r_5$.

One method of avoiding such a situation is to generate all possible permutations among values <1>, <2>, <3>, <4>, and <5>, thereby connecting 1→2, 1→3, 1→4, 1→5, etc. This method would retain the desired functionality, but performance would be lost due to the great number of redundant rules.

To avoid the burden of processing unnecessary rules, inducible rules are defined by the associated product rules. Looking again at the attribute layout presented in FIG. 7, the solid arrows represent the generated associated product rules 231 and 233 connecting values 1→3 and 3→5. If both rules are increasing pricing rules, rule 231 means "rate of product 230<rate of product 232" and rule 233 means "rate of product 232<rate of product 236."

The inducible rule 235, represented by a dashed arrow, can be induced from associated product rules 231 and 233. There are four principles which support the generation of inducible rules:

Pricing-Pricing: $r_1 > r_2 + \alpha, r_2 > r_3 + \beta \rightarrow r_1 > r_3 + \alpha + \beta$;

Gap-Gap: $r_1 = r_2 + \alpha, r_2 = r_3 + \beta \rightarrow r_1 = r_3 + \alpha + \beta$;

Pricing-Gap: $r_1 > r_2 + \alpha, r_2 = r_3 + \beta \rightarrow r_1 > r_3 + \alpha + \beta$;

Gap-Pricing: $r_1 = r_2 + \alpha, r_2 > r_3 + \beta \rightarrow r_1 > r_3 + \beta - \alpha$.

An associative, keyed, non-unique array containing all active products available in a given partition is used in the process of generating the rules. All of the pricing attributes corresponding to products in the array are known as the product key. Gap or partition attributes associated with products in the array are known as product data. The array embodies implementation details of the rules generation algorithm that are drawn towards storage and processing of the active products.

Figure 8:
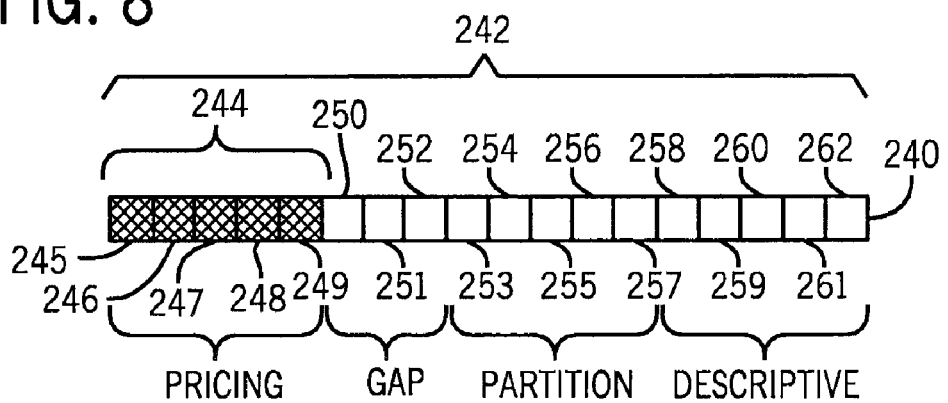
FIG. 8 illustrates the difference between product space and pricing space.

Given n pricing attributes, an n dimensional space is created called pricing space. The difference between the product space and pricing space is illustrated in FIG. 8. Array 240 contains all defined attributes. Thus, attributes 245-262, either individually or in combination, define all of the active, non-active, and non-existing products in the product space 242. Attributes 245-249 comprise the product key and therefore define the pricing space 244. Of the remaining attributes, attributes 250-257 are the product data and attributes 258-262 are descriptive. Thus, in the illustrated example, pricing space 244 has five dimensions whereas product space 242 has 18 dimensions.

Figure 9A:
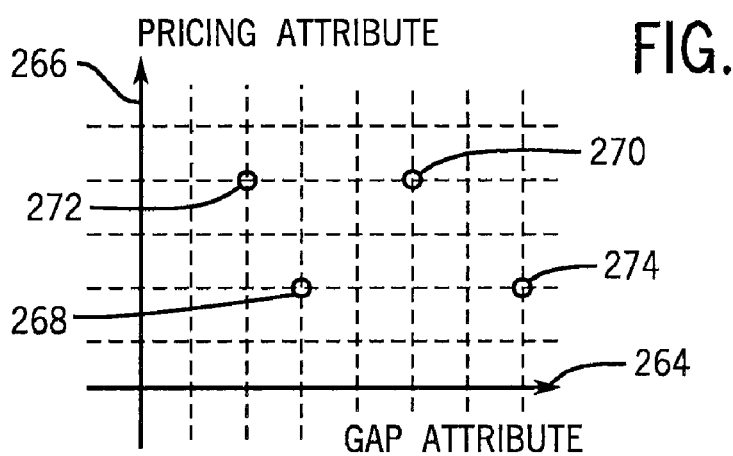
FIGS. 9a and 9b illustrate product space with two attributes.
Figure 9B:
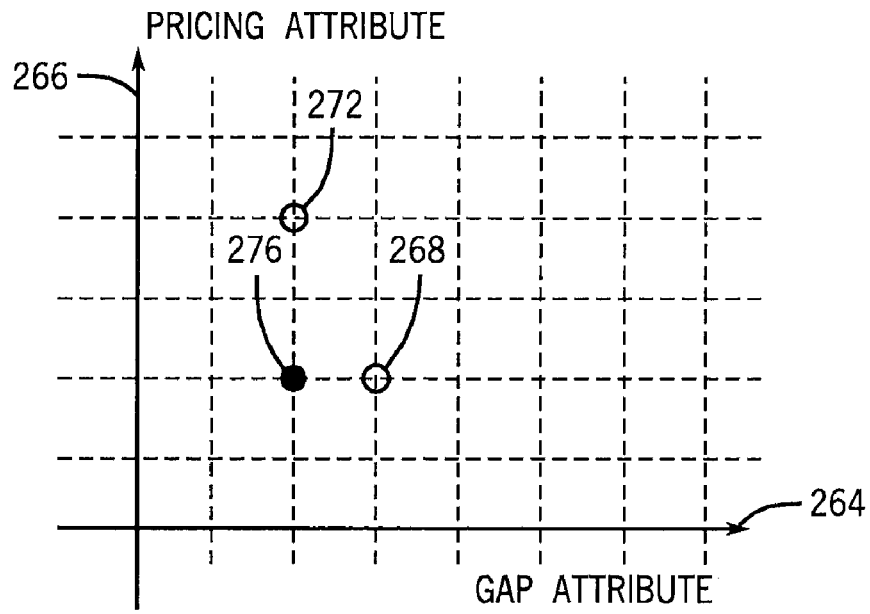

FIGS. 9a and 9b illustrate a product space with two attributes, pricing and gap. If the product keys of two products are the same, one equality associated product rule is created for both products (since the products are not differentiated by either pricing or gap attributes). If there are N products with the same product key, then N−1 equality associated product rules are created connecting the products.

In FIG. 9a, the product space is illustrated as a two-dimensional graph. Axis 264 displays the gap attribute values and axis 266 displays the pricing attribute values. Products 268 and 274 have the same product key even though their gap attributes have different values. Likewise, products 272 and 270 have the same product key and different gap attribute values. In generating the equality associated product rules, the algorithm iterates through each value along the pricing attribute axis 266, creating equality associated product rules for all products with the same pricing attribute value: $r_{268} = r_{274} + \alpha$ and $r_{272} = r_{270} + \beta$, where $\alpha$ and $\beta$ represent the gap value between products 268 and 274 and products 272 and 270, respectively.

For products with different pricing attribute values inequality associated product rules are created. Although the rate movement direction of an attribute could be increasing or decreasing, the decreasing rules are temporarily reversed to make the axis in product space only increase in value.

For each value of the gap attribute, one product is selected, such as products 268 and 272, and the inequality associated product rule between the two products is created. This inequality associated product rule or inequality rule, along with the equality associated product rules already created, could then be used to generate inequality associated product rules between remaining products 274 and 270 through induction: $r_{268} < r_{272} + v$, where v is the difference in gap attributes for products 268 and 272 (the determination of v is described below).

The difference in gap attributes is generated using a temporary product 276 shown in FIG. 9*b* (products 270 and 274 are not illustrated for clarity). First, the rules between temporary product 276 and product 268 and temporary product 276 and product 272 are calculated. These rules are then used to generate the rule between product 268 and product 272:

rate of product 272 in pricing attribute>rate of product 276 in pricing attribute+α;

rate of product 268 in gap attribute=rate of product 276 in gap attribute+β;

therefore: rate of product 272>rate of product 268+ α−β for products 268 and 272.

Figure 10:
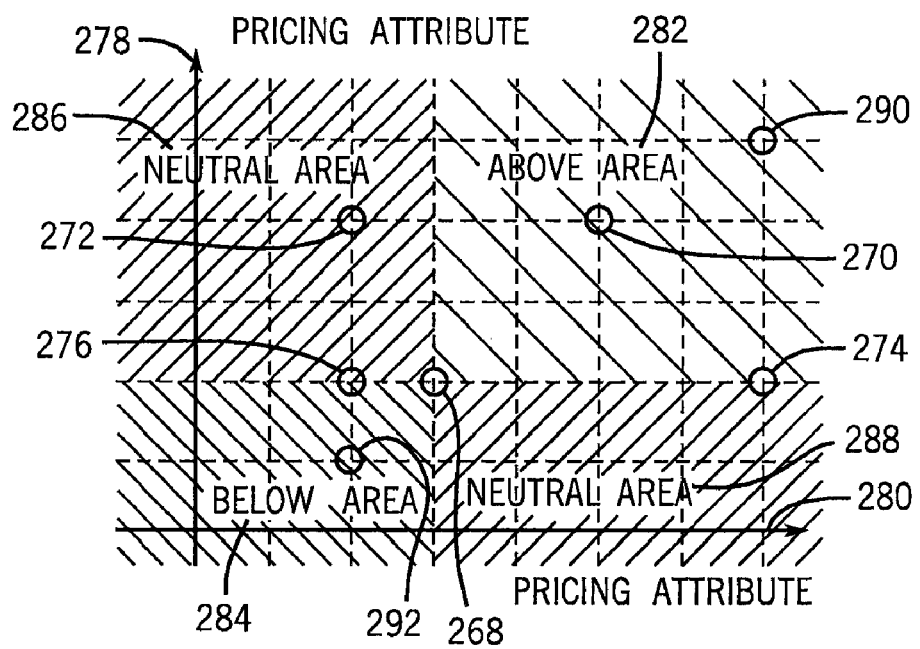
FIG. 10 presents a graph of the pricing attributes for multiple products in two dimensions.

The associated product rules for the gap attribute are then generated. FIG. 10 presents a two dimensional graph of the pricing attribute for products 268, 272, 270, and 274, as well as temporary product 276 and a new product 290. Taking product 268 first, the pricing space is separated into four areas with respect to product 268, above 282, neutral 286, below 284, and neutral 288.

When iterating product 268, only rules relating to some of the products in the area above 282 are generated while others are induced such that only the minimum number of rules are generated. For example, the rule for product 290 and product 268 can be an inducible associated product rule determined from the rules relating product 268 and product 270 and relating product 270 and product 290.

For the products in the area below 284, the rules for product 268 are created when generating the rules for products in those areas (product 292). No rules are generated between product 268 and products in neutral areas (286 and 288), such as product 272. Thus:

From FIG. 9b: rate of 272 in pricing attribute>rate of 274 in pricing attribute+α;

From FIG. 10: rate of 268 in gap attribute<rate of 274 in gap attribute+β.

From these two rules, rules between 268 and 272 can be induced.

Except for products in a cutoff zone, all products in the pricing space are iterated through and associated product rules are created between the current product and other products in the above area for the given product. To minimize the number of rules generated, the product key of the current product is connected to the nearest product key in the relevant area above. After each connection, the above area of the current product key can be reduced by subtracting the above area of the just connected product key. This is repeated until the above area for the current product shrinks to null. The connections may be dropped after rule general is complete and the iteration point moves to the nearest product. The connection may then be recalculated for the new product key to link its nearest product key in the relevant area above. If the above area does not have any active products or there is no above area, the algorithm stops to create the connections and the generation process ends. CLR limits the price movement range in optimization and are specified through the interface of FIG. 5*a* or the functional interface of FIG. 5*b*.

A completed optimization cycle results in a set of optimized scenarios. Each scenario represents a portfolio of recommended optimum rates that targets specific objectives of the financial institution. For example, one scenario can represent recommended rates for achieving maximum profitability, another can represent recommendations for achieving maximum volume of transactions, and yet another can represent mixed strategy targeting improvements in both volume and profitability. The POB system can be run multiple times using different combinations of rules to analyze the resulting scenarios in view of overall key performance indicator numbers on any portfolio segment down to a distinct rate cell.

Figure 11:
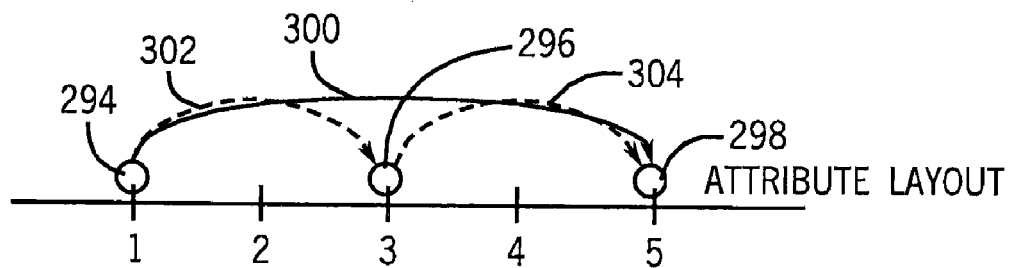
FIG. 11 graphically illustrates the process of densification.

Because the optimization process considers only products which actively contribute to the key performance indicators, the optimized scenarios usually do not cover all rate cells. Although the actively contributing products are the best sellers, they may represent only a small subset of available rate cells. Densification is used to infer rates for missing (empty) rate cells based on optimized rates and the structure established by associated product rules and cell-level rules. Since these products do not contribute to overall key performance indicators, they rarely affect portfolio level rules and constraints. For example, in FIG. 11, if the rate cell of product 296 is empty but is connected to the cells of products 294 and 298, both of which actively contribute to the overall key performance indicators, the allowed range of rate motion for product 296 can be inferred. The rate of motion of product 296 as well as the rule connecting products 294 and 298, shown as solid arrow 300, are sufficient to create a rate recommendation for product 296. Thus, the rate recommendation for all empty cells can be determined through densification in a manner that does not disturb the results of the optimized scenario and maintains the objectives of the financial institution.

To perform the densification, multiple scans of the entire attribute space are made for each empty rate cell of a product. For example, from the position of product 296 in attribute space, the minimum allowed rate for product 296 can be determined from the complimentary space above product 296 (i.e., the space between products 296 and 298 illustrated by dashed arrow 304) and the maximum allowed rate from the space below product 296 (i.e., the space between products 296 and 294 illustrated by dashed arrow 302). That is, the rate for product 296 should be less than the minimum of the rates of all products that have a higher rate than product 296, and higher than the maximum of the rates of all products that have lower rates than product 296.

After the minimum and maximum range is found, the rate of product 296 is either set or postponed from being set at some mid-point between the minimum and maximum. Setting the rate of product 296 will be postponed if there is a high density of empty cells surrounding product 296. This ensures that the densification proceeds from the regions with high density of populated cells. In a way the densification process resembles the method of completing a jigsaw puzzle. The optimizer provides the positions of some (but not necessarily all) cells. The filling of the empty cells then starts with the cell immediately adjacent to the already filled cells and proceeds outwards until all the cells are filled in.

Both the densification process and rule generation process assume that the pre-optimized starting rate configurations are in the feasible region of the applicable algorithms, meaning that they do not violate any business rules. In some cases, however, the starting rates do violate business rules. In such situations, the violated rules are relaxed by applying modifications that ensure feasibility of the initial point while encouraging optimization scenarios that actually fix the violated rules. For example, if a rule implies A<B, but for the initial point is A=B+5>B, the rule will be relaxed to the form A<B+ 5.

If, after optimization, the rule is still violated, all of the empty cells connected to products A and B through the rule structure can produce rate recommendations that potentially violate the rules as well. In this case, the densification will be performed based on the structure defined by relaxed rules as well.

Figure 12:
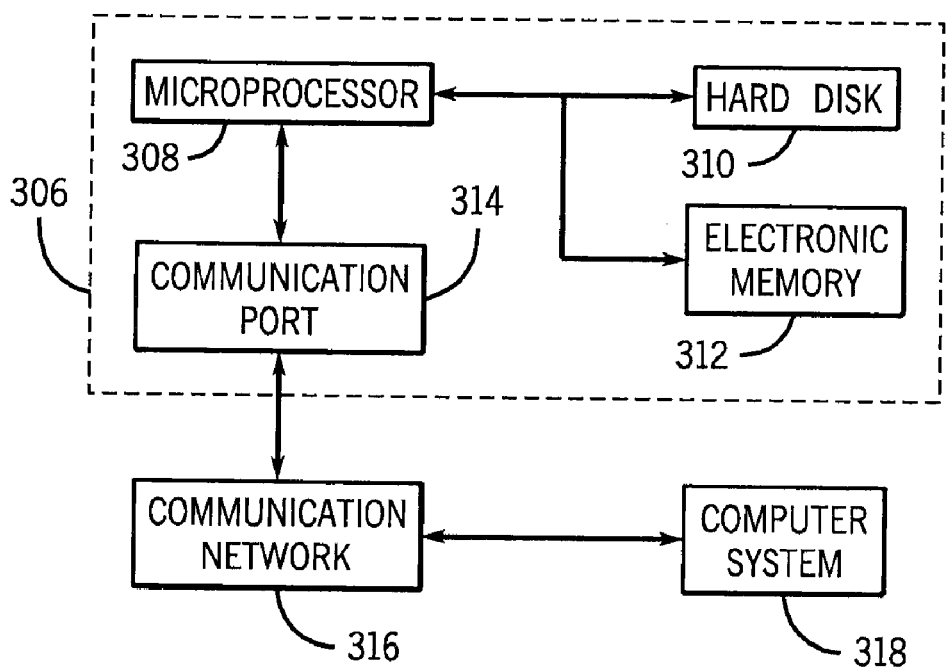
FIG. 12 illustrates an example system for operating the POB system.

FIG. 12 illustrates an example system for operating the POB system. Individual users would access the POB system through computer system 318. Computer system 318 is connected to a communication network 316 which connects to a computer 306 via a communication port 314. Computer 306 includes a microprocessor 308 connected to hard disk 310 and electronic memory 312, in which the POB system computer code is stored, as well as communication port 314. The user inputs all required information and begins the POB system through computer system 318. The inputted data is transferred from computer system 318 by the communication network 316 to computer 306, where the POB system is run. The results returned to the computer system 318 through the communication network 316.

While one or more embodiments of the present invention have been illustrated in detail, the skilled artisan will appreciate that modifications and adaptations to those embodiments may be made without departing from the scope of the present invention as set forth in the following claims.

What is claimed is:

1. A computer implemented method of determining an optimized rate value of a target product in a financial system, comprising:
    providing a plurality of products in the financial system, each of the plurality of products defined by a set of attributes and associated values;
    defining, by a processor, for each of the plurality of products, associated product rules for the plurality of products that impact a rate value of the plurality of products, each of the associated product rules being one of linear rules or rules reducible to a linear form and relating to two of the plurality of products, the defining of the associated product rules comprising:
        specifying the attributes and an attribute hierarchy for each of the associated product rules;
        specifying a rule type for each of the specified attributes;
        specifying a direction of a rate movement direction for the specified attributes; and
        specifying a gap value for each of the specified attributes;
    defining a set of rules that preserves the relationships between the associated products specified by the associated product rules, at least some of the set of rules being mathematically induced from the associated product rules; and
    optimizing, by the processor, the set of rules to produce an optimized scenario, wherein the optimizing comprises:
        applying the set of rules to the plurality of products that actively contribute to a key product indicator;
        performing densification to infer the optimized rate value for each of the plurality of products which do not actively contribute to the key product indicator;
        determining that a starting rate of one of the plurality of products violates the first associated product rule;
        relaxing the starting rate of one of the plurality of products in response to the determining; and
    providing an output including a recommendation of the optimized rate value for the target product to achieve a target in the optimized scenario, wherein the target includes a profit value and a sales volume value.

2. The computer implemented method of claim 1, wherein the rule type for each of the specified attributes is selected from the group consisting of an inequality rule, an equality rule, and a partition rule.

3. The computer implemented method of claim 1, wherein the induced rules of the set of rules are generated based on four principles, the four principles comprising:
    a pricing-pricing inducing principle defined by $r_1 > r_2 + \alpha$, $r_2 > r_3 + \beta \rightarrow r_1 > r_3 + \alpha + \beta$;
    a gap-gap inducing principle defined by $r_1 = r_2 + \alpha$, $r_2 = r_3 + \beta \rightarrow r_1 = r_3 + \alpha + \beta$;
    a pricing-gap inducing principle defined by $r_1 > r_2 + \alpha$, $r_2 = r_3 + \beta \rightarrow r_1 > r_3 + \alpha + \beta$; and
    a gap-pricing inducing principal defined by $r_1 = r_2 + \alpha$, $r_2 > r_3 + \beta \rightarrow r_1 > r_3 + \beta - \alpha$;
    where $r_1$, $r_2$, and $r_3$ are each one of a pricing rate value related to the associated product rules; and $\alpha$ and $\beta$ are gap values representing a range over which the associated product rules apply.

4. The computer implemented method of claim 1, further comprising transforming the associated product rules into mathematical formulas.

5. The computer implemented method of claim 4, further comprising:
    determining whether at least one of the plurality of products actively contributes to the key product indicator;
    determining whether at least one of the plurality of products does not actively contribute to the key product indicator;
    determining whether at least one of the plurality of products is non-existing;
    providing an index for the attributes of the associated product rules;
    setting the index to i;
    determining an attribute value set (AVS) function defined as $AVS_i = \{AV\}$, where the function $AVS_i$ is a set of the attribute values for an attribute within a partition and AV is the set of the attribute values for the attribute within the partition;
    determining an attribute axis set (AXIS) function defined as $AXIS_i = [AV_1 < AV_2 < \ldots < AV_n] | AV_i \in AVS_i$, where the function $AXIS_i$ is a unique, sorted, non-associative array where the AVS is organized in a sequential order, and where n is the total possible number of attribute values for an attribute;
    determining a product space function defined as product space $= \{[AV_1, AV_2, \ldots, AV_n] | \forall AV_i : AV_i \in AXIS_i\}$, where the function product space defines all possible products for the plurality of products; and
    determining a cutoff zone function defined as cutoff zone $= \{$inactive products $\cup$ non-existing products$\}$, where the function cutoff zone defines a subset of the function product space including the plurality of products that do not actively contribute to the key product indicator and the plurality of products that are non-existing.

6. The computer implemented method of claim 1, wherein the performing of the densification further comprises:
    determining a minimum possible rate value of one of the plurality of products, where the minimum possible rate value is less than a minimum rate value of a member of the plurality of products having a higher rate value;
    determining a maximum possible rate value of one of the plurality of products, where the maximum possible rate value is greater than a maximum rate value of the member of the plurality products having a lower rate value; and setting the optimized rate value to a mid-point between the minimum possible rate value and the maximum possible rate value.

7. The computer implemented method of claim 1, wherein the relaxing of the starting rate comprises relaxing the associated product rule by modifying the associated product rule to ensure feasibility of the starting rate.

8. The computer implemented method of claim 1, further comprising:
defining a cell-level rule; and
optimizing the cell-level rule.

9. The computer implemented method of claim 8, wherein the defining of the cell-level rule further comprises:
defining a product key;
defining the starting rate;
defining a minimum rate value for optimization; and
defining a maximized rate value for optimization.

10. The computer implemented method of claim 9, further comprises transforming the cell-level rule into a mathematical formula.

11. The computer implemented method of claim 1, wherein the direction of the rate movement is selected from a group consisting of an increase with a minimum gap, a decrease with a minimum gap, an increase with an exact gap, and a decrease with an exact gap.

12. A computer implemented method of determining a set of rules for determining an optimized rate value of a target product in a financial system, comprising:
receiving data representative of a plurality of products in the financial system, each of the plurality of products defined by a set of attributes and associated values;
defining, by a processor, for each of the plurality of products, associated product rules for the plurality of products that impact a rate value of the plurality of products, each of the associated product rules being one of linear rules or rules reducible to a linear form and relating to two of the plurality of products, the defining of the associated product rules comprising:
specifying the attributes and an attribute hierarchy for each of the associated product rules;
specifying a rule type for each of the specified attributes;
specifying a direction of a rate movement direction for the specified attributes; and
specifying a gap value for each of the specified attributes; and
defining, by the processor, a set of rules that preserves the relationships between the products specified by the associated product rules, at least some of the set of rules being mathematically induced from the associated product rules.

13. The computer implemented method of claim 12, wherein the rule type for each of the specified attributes is selected from the group consisting of an inequality rule, an equality rule, and a partition rule.

14. The computer implemented method of claim 12, wherein the direction of the rate movement is selected from a group consisting of an increase with a minimum gap, a decrease with a minimum gap, an increase with an exact gap, and a decrease with an exact gap.

15. The computer implemented method of claim 12, wherein the induced rules of the set of rules are generated based on four principles, the four principles comprising:
a pricing-pricing inducing principle defined by $r_1 > r_2 + \alpha$, $r_2 > r_3 + \beta \rightarrow r_1 > r_3 + \alpha + \beta$;
a gap-gap inducing principle defined by $r_1 = r_2 + \alpha$, $r_2 = r_3 + \beta \rightarrow r_1 = r_3 + \alpha + \beta$;
a pricing-gap inducing principle defined by $r_1 > r_2 + \alpha$, $r_2 = r_3 + \beta \rightarrow r_1 > r_3 + \alpha + \beta$; and
a gap-pricing inducing principal defined by $r_1 = r_2 + \alpha$, $r_2 > r_3 + \beta \rightarrow r_1 > r_3 + \beta - \alpha$;
where $r_1$, $r_2$, and $r_3$ are each one of a pricing rate value related to the associated product rules; and $\alpha$ and $\beta$ are gap values representing a range over which the associated product rules apply.

16. The computer implemented method of claim 12, further comprising transforming the associated product rules into mathematical formulas.

17. The computer implemented method of claim 16, further comprising:
determining whether at least one of the plurality of products actively contributes to the key product indicator;
determining whether at least one of the plurality of products does not actively contribute to the key product indicator;
determining whether at least one of the plurality of products is non-existing;
providing an index for the attributes of the associated product rules;
setting the index to i;
determining an attribute value set (AVS) function defined as $AVS_i = \{AV\}$, where the function $AVS_i$ is a set of the attribute values for an attribute and AV is the set of the attribute values for the attribute;
determining an attribute axis set (AXIS) function defined as $AXIS_i = [AV_1 < AV_2 < \ldots < AV_n] | AV_i \in AVS_i$, where the function $AXIS_i$ is a unique, sorted, non-associative array where the AVS is organized in a sequential order, and where n is the total possible number of attribute values for an attribute;
determining a product space function defined as product space $= \{[AV_1, AV_2, \ldots, AV_n] | \forall AV_i : AV_i \in AXIS_i\}$, where the function product space defines all possible products for the plurality of products; and
determining a cutoff zone function defined as cutoff zone $= \{\text{inactive products} \cup \text{non-existing products}\}$, where the function cutoff zone defines a subset of the function product space including the plurality of products that do not actively contribute to the key product indicator and the plurality of products that are non-existing.

18. The computer implemented method of claim 12, further comprising:
defining a cell-level rule; and
optimizing the cell-level rule.

19. The computer implemented method of claim 18, wherein the defining of the cell-level rule further comprises:
defining a product key;
defining the starting rate;
defining a minimum rate value for optimization; and
defining a maximized rate value for optimization.

20. The computer implemented method of claim 19, further comprises transforming the cell-level rule into a mathematical formula.

21. A non-transitory computer readable medium having program instructions stored thereon, the instructions comprising:
instructions to receive data representative of a plurality of products in the financial system, each of the plurality of products defined by a set of attributes and associated values;
instructions to define, by a processor for each of the plurality of products, associated product rules for the plurality of products that impact a rate value of the plurality of products, each of the associated product rules being one of linear rules or rules reducible to a linear form and relating to two of the plurality of products, the defining of the associated product rules comprising:

instructions to specify the attributes and an attribute hierarchy for each of the associated product rules;

instructions to specify a rule type for each of the specified attributes;

instructions to specify a direction of a rate movement direction for the specified attributes; and instructions to specify a gap value for each of the specified attributes; and instructions to define a set of rules that preserves the relationships between the associated products specified by the associated product rules, at least some of the set of rules being mathematically induced from the associated product rules.

* * * * *